Patented July 22, 1941

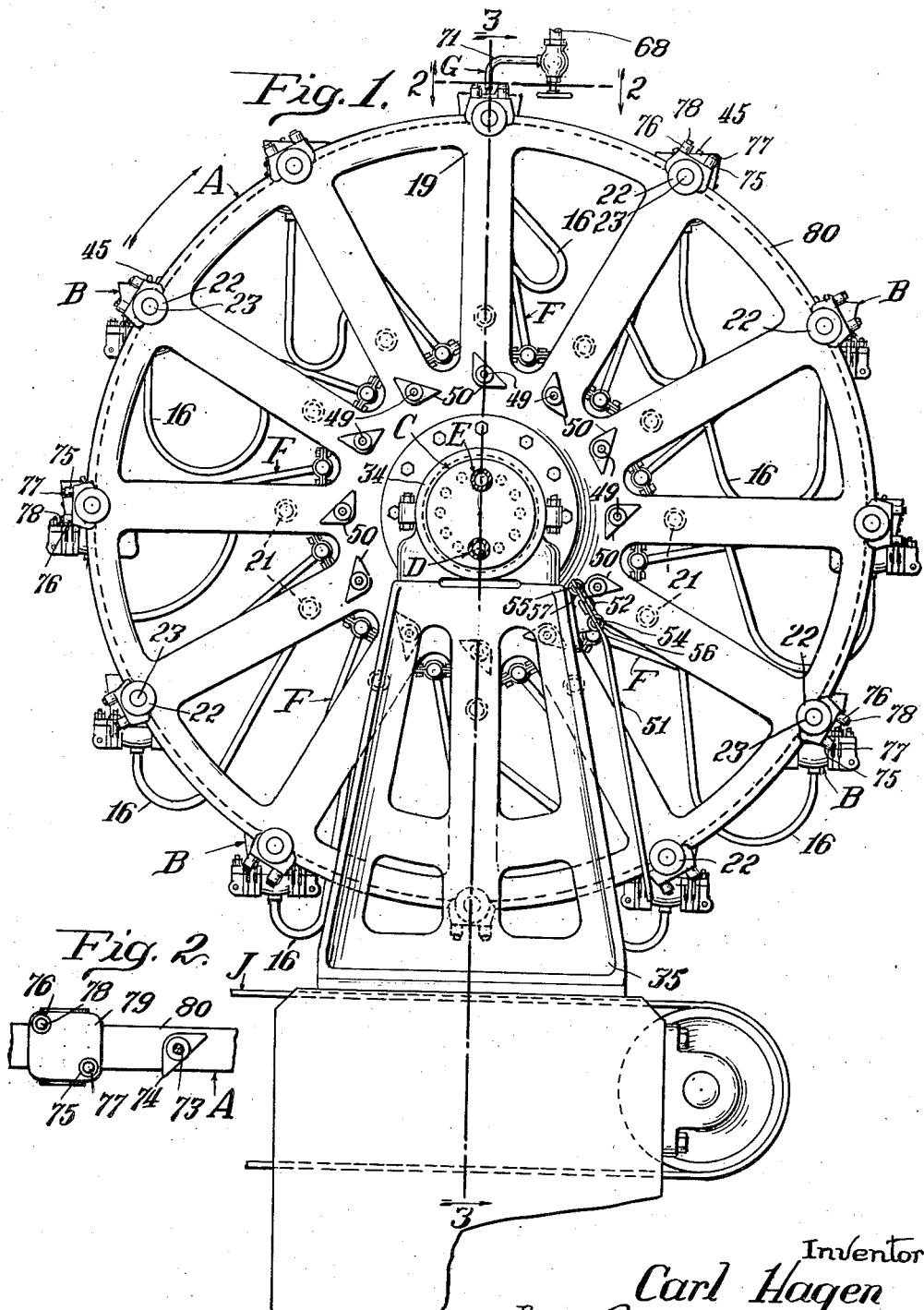

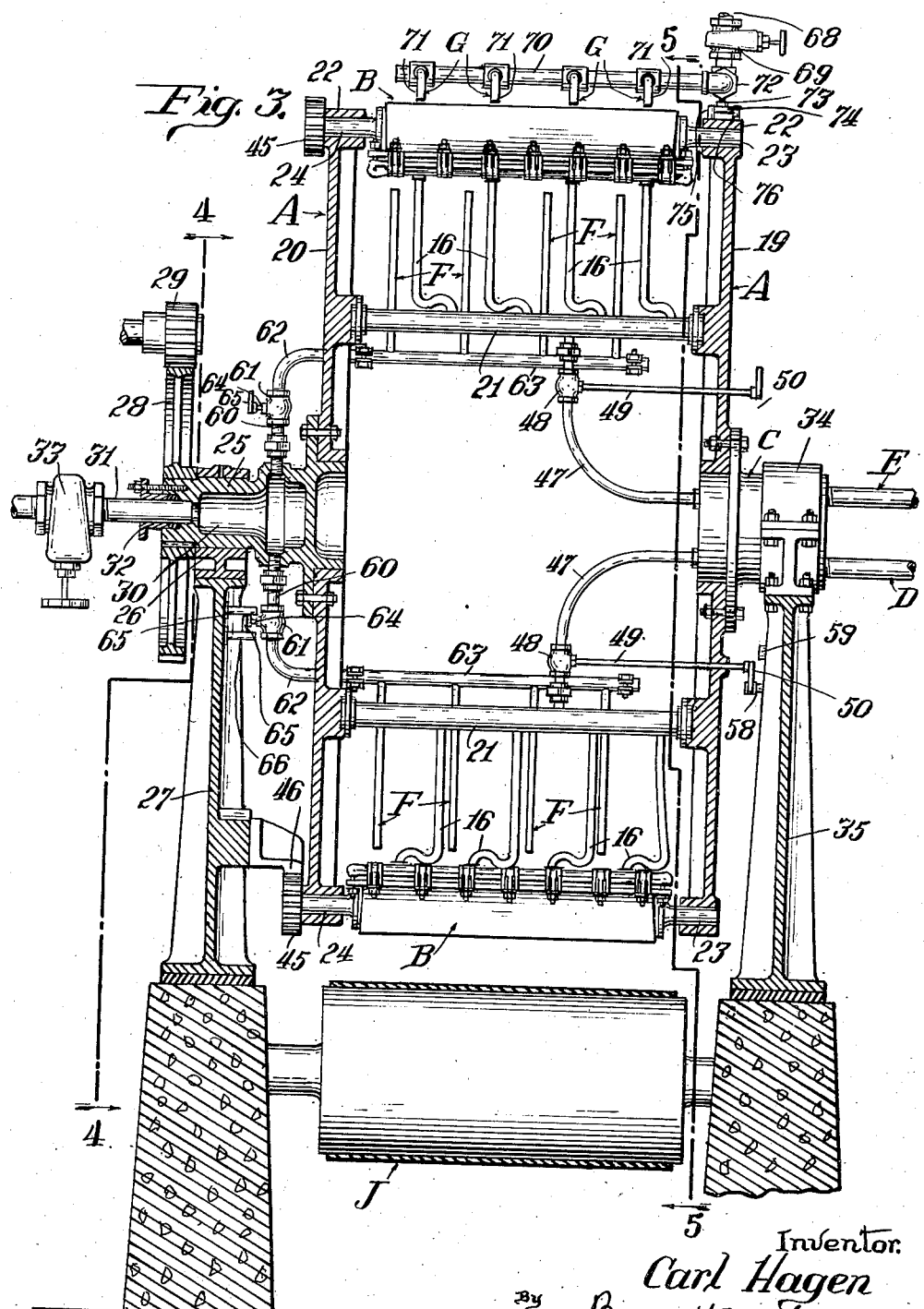

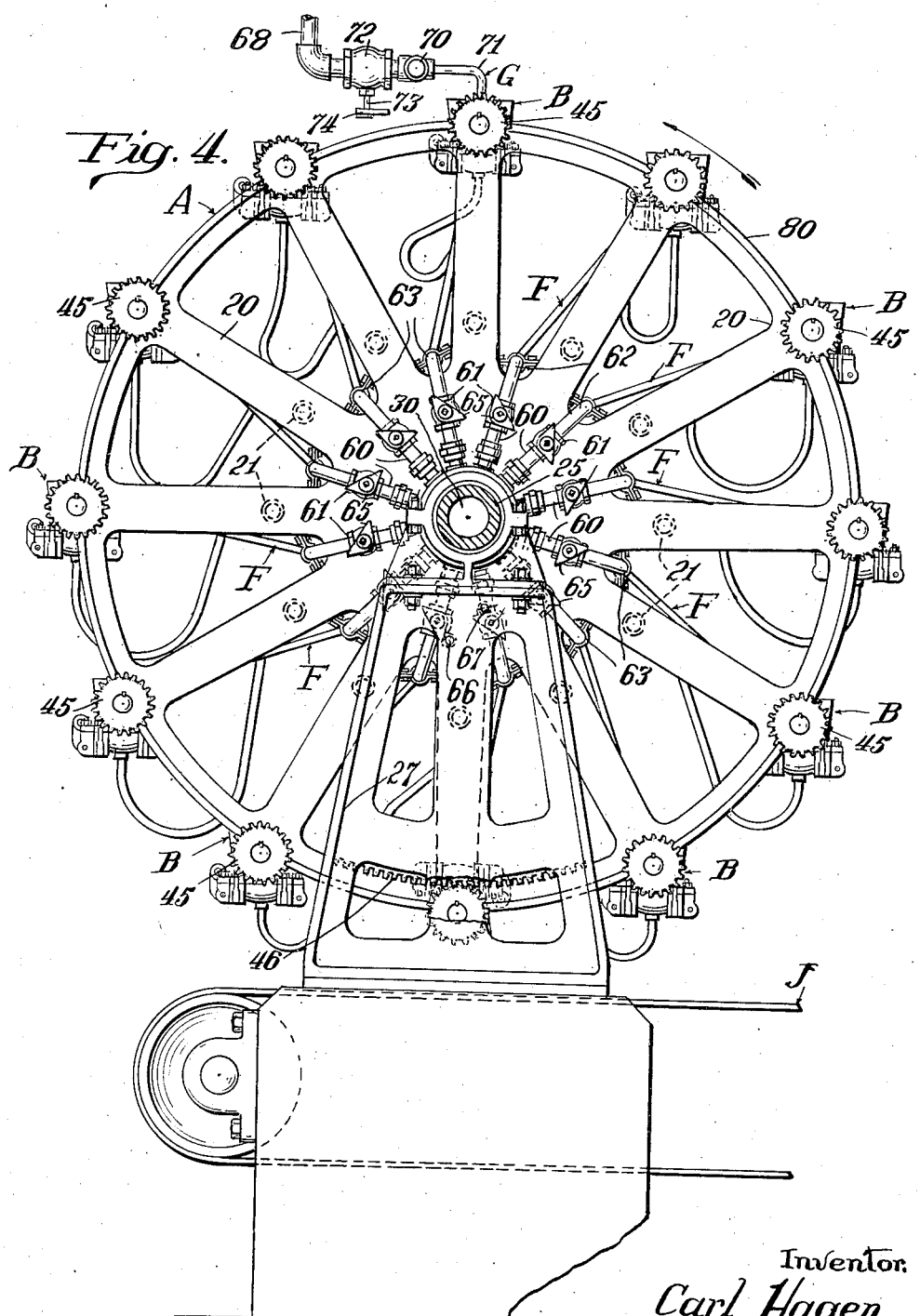

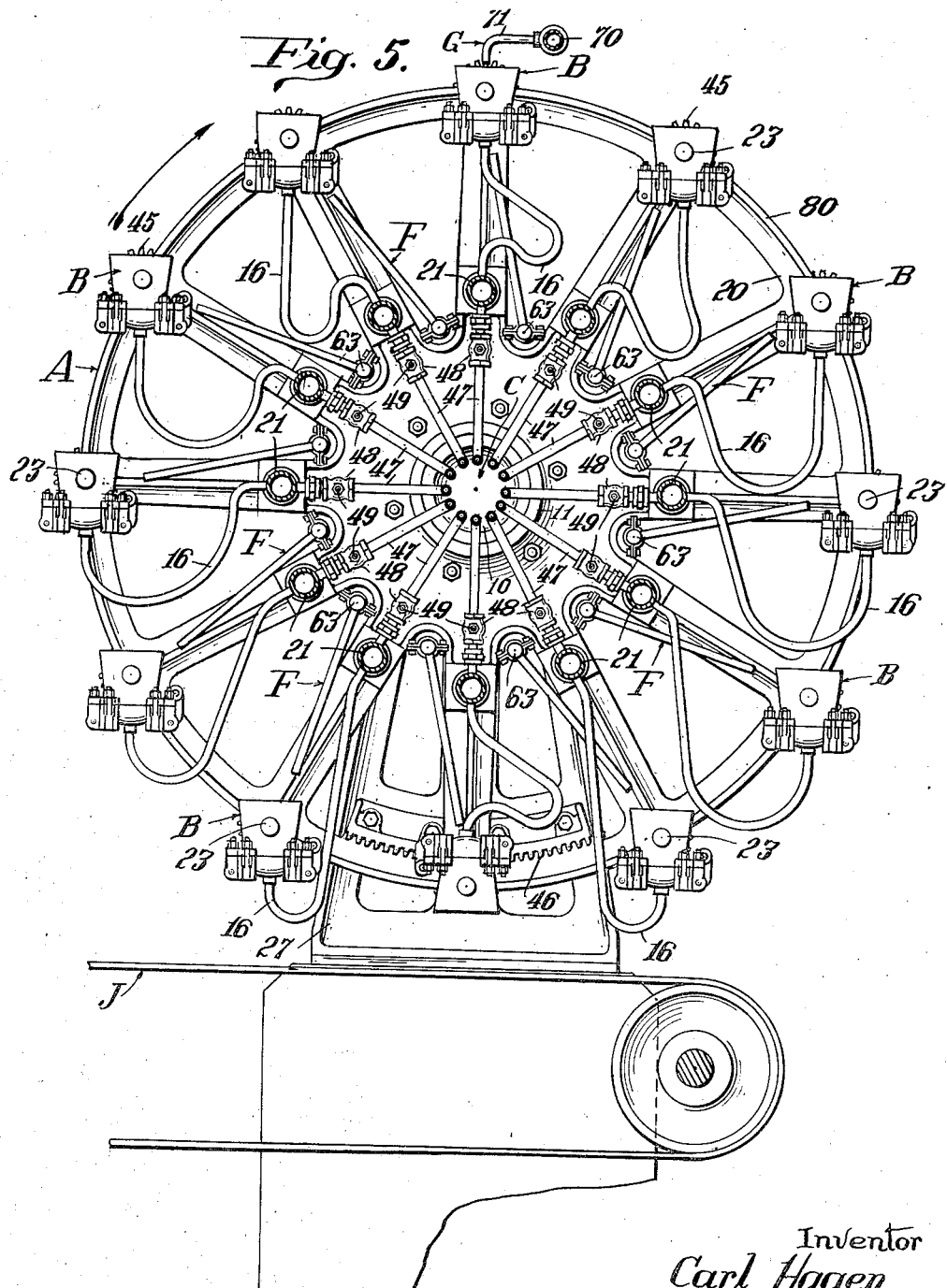

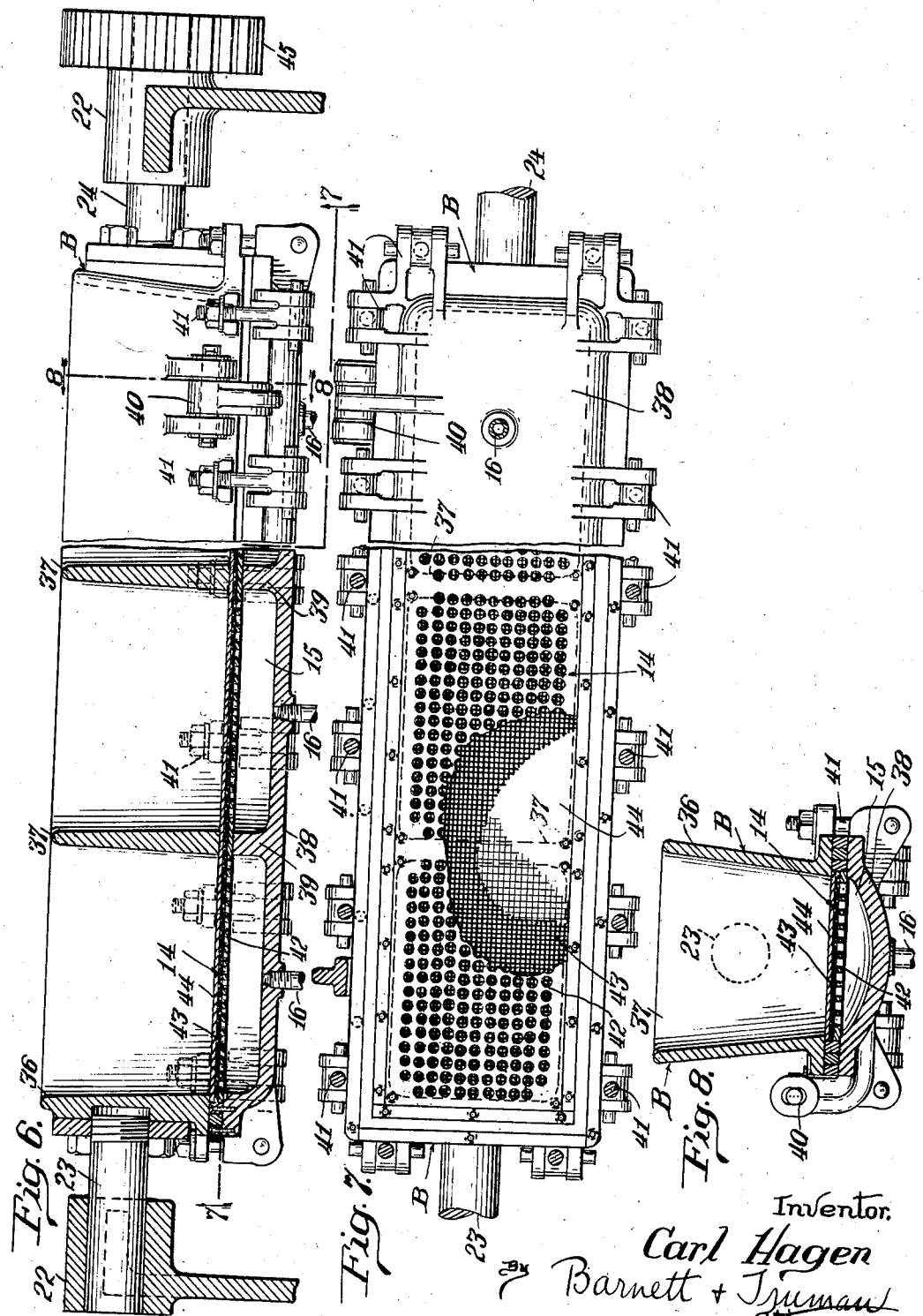

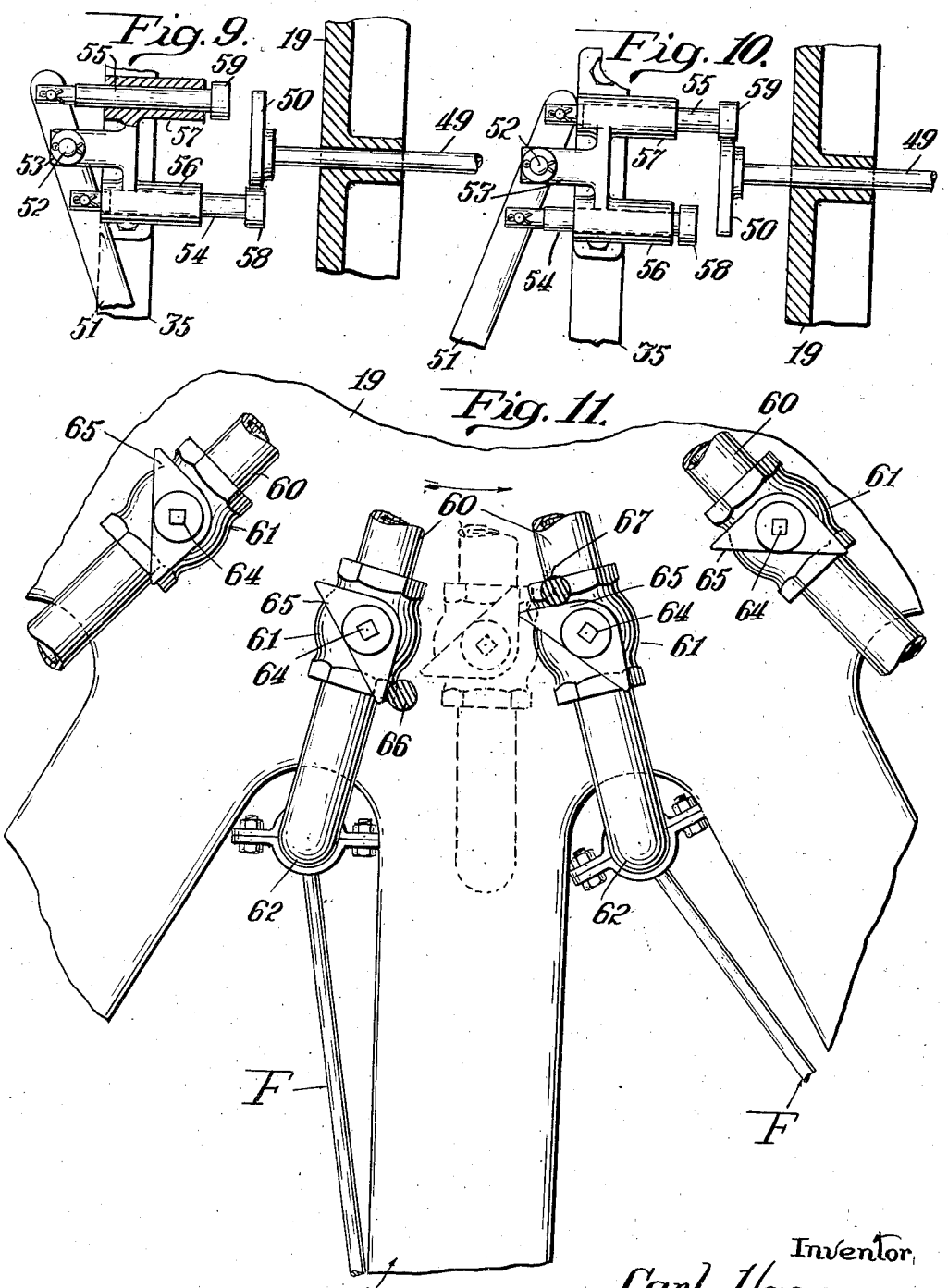

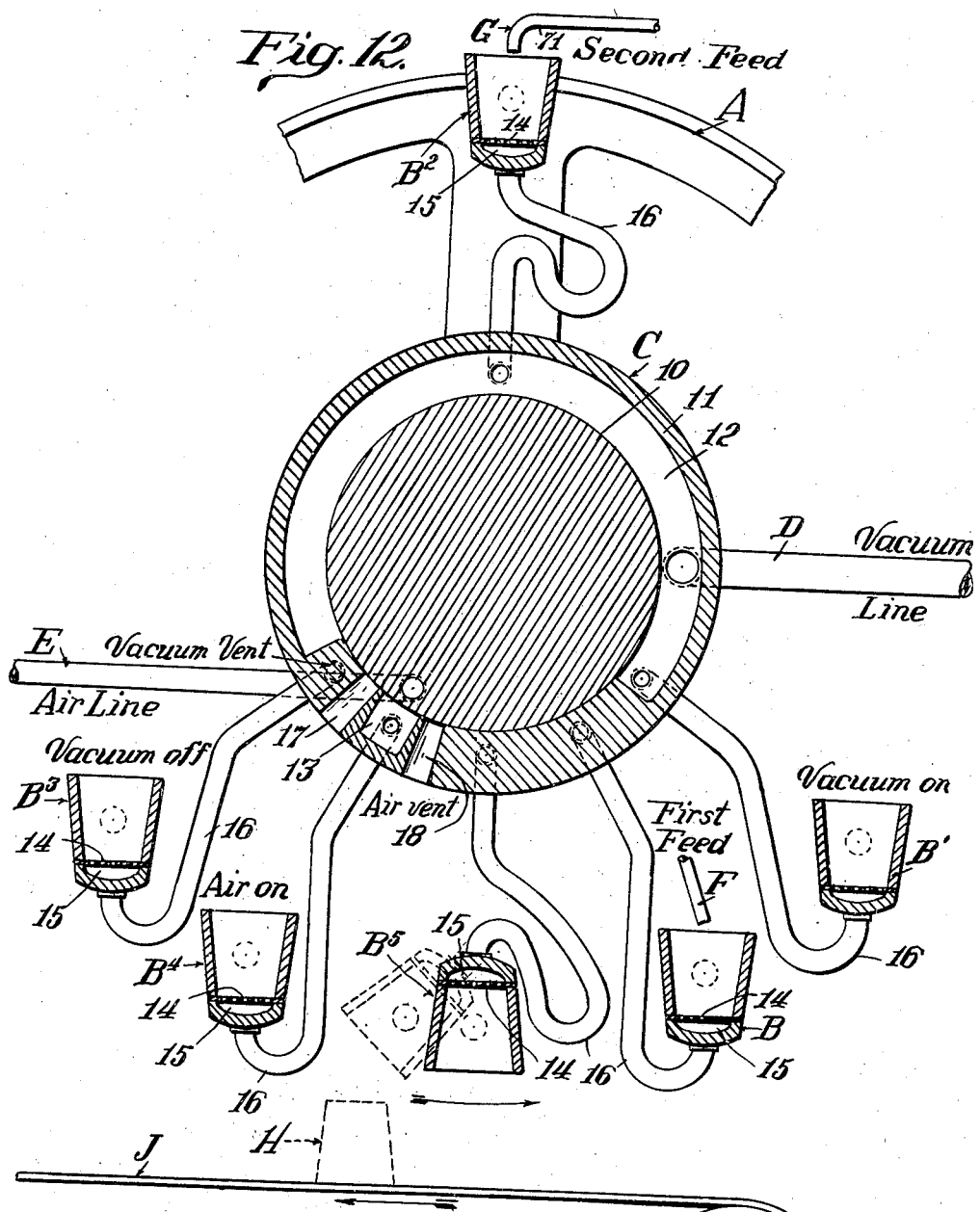

2,249,823

UNITED STATES PATENT OFFICE 2,249,823

STARCH CAKE FORMING MACHINE

Carl Hagen, Park Ridge, Ill., assignor to Corn Products Refining Company, New York, N. Y., a corporation of New Jersey Application September 24, 1938, Serial No. 231,497

13 Claims. (Cl. 18—26)

This invention relates to the formation of starch cakes from mixtures of starch and water. This operation is one of the steps in the process of making certain types of treated starch, such as crystal starches in which water is removed from a mixture of starch and water (that may also contain chemicals such as borax or nitric acid) leaving the starch in the form of cakes which are subjected to drying operations and then broken up.

Heretofore, the cakes have been formed by pouring the starch-water mixture into stationary drip boxes having water pervious bottoms through which water filters out leaving starch cakes having about 48% moisture content. The cakes are then broken up and then subjected first to a quick and then to a slow drying operation. The formation of the cakes requires ordinarily about ten hours and entails considerable labor. The principal object of the present invention is to provide a machine for forming the cakes automatically, whereby the operation is very much shortened, for example, from about ten hours to ten minutes, labor is saved, the operation is less wasteful and much more cleanly, and a saving of chemicals such as borax and nitric acid is made if these are used in the process.

The machine might be used for forming starch cakes for other processes than those mentioned or for forming cakes of other material than starch where similar conditions prevail.

The invention is illustrated in the accompanying drawings which show a preferred embodiment of the invention. The intention, however, is to cover all equivalents and also all modifications within the scope of the hereto appended claims.

Referring to the drawings,

Figure 1 is a side elevation of the cake forming machine taken from the right-hand side of the sectional view shown in Figure 3.

Figure 2 is a detail sectional plan on line 2—2 of Figure 1.

Figure 3 is a vertical sectional view on line 3—3 of Figure 1.

Figure 4 is a sectional view on line 4—4 of Figure 3.

Figure 5 is a vertical sectional view on line 5—5 of Figure 3.

Figure 6 is a side elevation, with parts in section, of one of the cake forming boxes.

Figure 7 is an inverted plan view of the box with certain parts broken away.

Figure 8 is a vertical sectional view on line 8—8 of Figure 6.

Figure 9 is a detail sectional view of the device for automatically opening and closing the valves which govern the application of the vacuum to the cake forming boxes.

Figure 10 is a view similar to Figure 9 except with the parts in a different working position.

Figure 11 is a fragmentary view on an enlarged scale and in the plane of Figure 4 to illustrate the operation of the valves for controlling the first feed of the starch-water mixture to the cake forming boxes; the supplemental feed of starch being controlled by the valve mechanism illustrated particularly in Figure 2; and Figure 12 is a diagram illustrating the operation of the machine.

*Operation.*—Referring first to Figure 12, A designates a rotating structure of the Ferris wheel type, at the periphery of which are pivotally suspended in spaced relation a plurality of vacuum or cake forming boxes B, one of which is shown in this figure in several successive positions to illustrate the sequence of operations which take place in the forming and discharge of the starch cake. The apparatus comprises a main vacuum and air valve C, which is of known construction and is shown diagrammatically in Figure 12 without being detailed in the other drawings. This valve comprises a stationary element 10 and a rotating annular element 11, which has a rigid relationship with a wheel A. These valve elements are formed to provide a vacuum duct 12 from which leads the main vacuum line D to the exhausting apparatus, not shown, and a compressed air duct 13 to which leads the main air line E connected with a compressor or other source of air under pressure.

The cake forming box is provided with a water pervious false bottom 14, below which is a vacuum space 15 connected with the rotating element 11 by a conduit, part of which consists of a flexible looped hose 16.

The rotating part of the machine is constructed so as to provide a starch duct 31, 30, 60, 62, 63, as shown in the other figures of the drawings; and from this duct extend feed pipes F, one for each of the cake forming boxes, for initially filling the boxes with starch-water mixture. This operation takes place with the box in the position indicated by the letter B in Figure 12. The box, through rotation of the wheel, is then moved to the position B′ in which position suction is applied through connection 16 to the vacuum space 15 in the box to withdraw water from the starch-water mixture.

When the box reaches its position B², it comes under a second, stationary feed pipe G so as to receive additional starch-water mixture to make up for the loss in volume through withdrawal of water.

When the cake forming box reaches the position B³, the pipe conection between the box and the vacuum duct 12 is shut off. A further movement of the box puts it into communication with the atmosphere through vent 17 so as to break the vacuum in the chamber 15.

When the box reaches the position B⁴, it is put into communication with a duct 13, which in this position of the rotating valve element 11 communicates with the compressed air line E so that the now formed cake is loosened from the box by air pressure exerted through the pervious false bottom 14. As the box moves toward position B⁵, the compressed air is shut off and air pressure in the box vented to the atmosphere through vent 18. Thereafter the box is inverted, by apparatus to be described, discharging the cake, indicated at H, on a belt conveyor J, or other suitable apparatus for carrying away the cakes from the forming machine.

It would be possible to apply the compressed air after the inversion of the box, or while it is being inverted, but it has been found that better results are obtained by applying the compressed air while the box is in the upright position.

*Apparatus.*—Referring now to the other figures: the wheel structure A consists of two wheel members 19, 20, connected together by pipes 21, one for each cake forming box which also serve as part of the air system as will be described. The wheel structures 19, 20 are provided with bearings 22, 22 for trunnions 23, 24 on the boxes. The wheel structure 20 has secured thereto a hollow hub member 25 which is supported in a bearing 26 on the frame member 27. Secured to hub 25 is a gear wheel 28 in mesh with a pinion 29 driven by any suitable motor (not shown). The wheel with its cake forming boxes is rotated in this way. The hub 25 is formed with a distributing chamber 30 with which the starch supply pipe 31 communicates, this pipe projecting through the outer end of hub 25, with the interposition of a stuffing box 32 and being provided with a valve 33 by means of which the first starch feed to the machine may be shut off. The wheel structure 19 on the other side of the machine is provided with a hub turning in bearings 34 on the side frame member 35. The hub on this side of the machine carries the main vacuum and air valve C, shown diagrammatically in Figure 12.

The preferred construction of the cake forming boxes is shown in Figures 6, 7 and 8. The box is divided in each case into four compartments arranged transversely of the wheel structure. This is to facilitate the formation and discharge of the cakes which can be better accomplished with cakes of relatively small size. The box consists in each case of an upper casting 36 provided with dividing webs 37, 37, and a lower casting 38 forming the bottom part of the box and provided with webs 39, 39, aligning with the dividing webs 37, 37. The lower casting is hinged at 40 to the upper casting, on one side of the box, and is secured to the upper casting on the other side of the box by clamps 41. The water pervious false bottom 14, above referred to, is clamped between the upper and lower castings and consists preferably of a perforated metal plate 42 above which is a wire mesh screen 43 and above this a sheet of cloth 44. The trunnions 23, 24 for pivotally supporting the box on the wheel structure are screwed into the upper casting as shown in the left-hand side of Figure 6. The trunnion 24 at the other end of the box is provided with a pinion 45 which engages a rack 46 (Figs. 3, 4 and 5) on the frame member 27 after the box leaves its B⁴ position (Figure 12). The engagement with the rack first inverts the box and then by a continued rotation in the same direction restores the box to its upright position. The flexible hoses 16 adjust themselves to this movement of the box.

Each of the four compartments of each box has its vacuum chamber 15, and each chamber is connected by a flexible hose 16 to the common air pipe 21, there being a pipe 21 for each of the boxes. Each pipe 21 is connected by a pipe 47 with the valve C and is provided with a valve 48 that is opened and closed automatically in accordance with the position of the manually set mechanism shown in Figure 3, and in detail in Figures 9 and 10. Valve 48 has a stem 49 extending through wheel structure 19, to which stem is secured a cam 50. 51 is a lever pivoted at 52 to a bracket 53 on the frame member 35 and having pivoted to it slide rods 54, 55 movable in guides 56, 57 in the frame member. The slide rods carry rollers 58, 59. With the valve controlling device in the position shown in Figure 9, the cams 50 on the valve stems 49 will engage the roller 58, as the machine rotates, to open the valves 48. With the lever 51 moved to the position shown in Figure 10, the cams 50 engage the roller 59 to close valves 48.

This control is desirable in order that when the machine is to be shut down and the starch feed to the vacuum boxes has been shut off, each box will be cut off from the main control valve, automatically, but only after it has completed its cycle of operations; and, conversely, in starting up the machine, the boxes will by the opening of valves 49 be put into communication with the main valve but only after they have been filled with starch and have reached the position in which the vacuum should be applied.

As has been stated, the machine has two starch feeds, a primary feed, when the box, in each case, is empty, and a second feed after the water has been largely removed from the starch mixture first introduced into the box. The starch for the first feed enters the chamber 30 in hub 25 through pipe 31 (Figure 3). Connected with hub 25 and leading from the chamber 30 are a plurality of pipes 60, one for each cake forming box, provided with valves 61, the pipes being curved at 62 with their ends 63 extending parallel with the boxes. The end portion 63 of the pipes are in effect headers and are provided with the discharge pipes F referred to in the description of Figure 12, there being one for each compartment of each box. The valve 61 controlling the flow of starch-water mixture through each of the pipes 60—62—63 is opened and then closed, while the cake forming box is approaching and proceeding from the position shown at B in Figure 12. The operation of one of these valves is shown at the lower left-hand side of Figure 3, and in detail in Figure 11. The movable members of valve 61 is provided with a stem 64 on which is fixed a cam 65. 66 is an opening pin on the frame member 27 of the machine which is engaged by cam 65 so as to be rotated and to rotate the valve to open the same. When cam 65 reaches the closing pin 67, it is rotated in the opposite direction and the valve closed. When the cake forming box, which is next put in communication with the vacuum space of valve C, reaches its B² position (Figure 12), that is, its uppermost position, it receives an increment of starch-water mixture through the auxiliary feeding device G.

Referring to Figures 1, 2, 3 and 4, the auxiliary feeding device G consists of a supply pipe 68 (preferably provided with a shut off valve 69) with which is connected a horizontally disposed header 70 having feed nozzles 71, one for each of the four compartments of the vacuum boxes. Between pipe 68 and header 70 is a valve 72, the valve member of which has a stem 73 carrying a cam 74. The cam is engaged, as the wheel rotates, by rollers 75, 76, one pair for each box, mounted on pins 77, 78 formed on bosses 79 on the rim portion 80 of the wheel structure 21. When the cam 74 engages one of the rollers 75, the valve 72 is opened. It is closed by contact of the cam with roller 76.

I claim:

1. In a starch cake forming machine, the combination of a continuously moving structure having an endless series of cake forming boxes supported in upright position and provided with water pervious bottoms; means for successively filling the boxes with starch-water mixture; means for creating a vacuum which withdraws water through the bottoms of the boxes; and means operating as each box reaches a certain position for inverting it and discharging the cake.

2. In a starch cake forming machine, the combination of a continuously moving structure having an endless series of cake forming boxes supported in upright position and provided with water pervious bottoms; means for successively filling the boxes with starch-water mixture; means for creating a vacuum which withdraws water through the bottoms of the boxes; means for adding starch-water mixture to each box after the vacuum has withdrawn water therefrom; and means operating as each box reaches a certain position for inverting it and discharging the cake.

3. In a starch cake forming machine, the combination of a continuously moving structure having an endless series of cake forming boxes supported in upright position and provided with water pervious bottoms; means for successively filling the boxes with starch-water mixture; means for creating a vacuum which withdraws water through the bottoms of the boxes; means for applying air under pressure to the under sides of the cakes as formed; and means operating as each box reaches a certain position for inverting it and discharging the cake.

4. In a starch cake forming machine, the combination of a continuously moving structure having an endless series of cake forming boxes supported in upright position and provided with water pervious bottoms; means for successively filling the boxes with starch-water mixture; means for creating a vacuum which withdraws water through the bottoms of the boxes; means for shutting off the suction and breaking the vacuum in the boxes successively; and means operating as each box reaches a certain position for inverting it and discharging the cake.

5. In a starch cake forming machine, the combination of a continuously moving structure having an endless series of cake forming boxes supported in upright position and provided with water pervious bottoms; means for successively filling the boxes with starch-water mixture; means for creating a vacuum which withdraws water through the bottoms of the boxes; means for shutting off the suction and breaking the vacuum in the boxes successively; means for applying air under pressure to the undersides of the formed cakes; and means operating as each box reaches a certain position for inverting it and discharging the cake.

6. In a starch cake forming machine, the combination of: a wheel revoluble in a vertical plane; a cake forming box pivotally suspended on the wheel from a horizontal pivotal axis and provided with a water pervious bottom and means thereunder forming a vacuum space means for giving the box one full revolution about its said pivotal axis for each revolution of the wheel; a main valve having stationary and rotating elements; a main vacuum pipe connected with said stationary element; and a pipe connection between said vacuum chamber and the rotating element of the main valve comprising a looped, flexible hose attached to the box.

7. In a starch cake forming machine, the combination of: a wheel revoluble in a vertical plane; a cake forming box pivotally suspended on the wheel from a horizontal pivotal axis and provided with a water pervious bottom and means thereunder forming a vacuum space; means for giving the box one full revolution about said pivotal axis for each revolution of the wheel; a main valve having stationary and rotating elements; a main vacuum pipe connected with said stationary element; and a pipe connection between said vacuum chamber and the rotating element of the main valve comprising an air header, a pipe connection between the movable element of the valve and said header; and a plurality of looped hoses connecting the vacuum space of the box with the header.

8. In a starch cake forming machine, the combination of: a wheel revoluble in a vertical plane; a cake forming box pivotally suspended on the wheel from a horizontal pivotal axis and formed with compartments having water pervious bottoms and vacuum chambers under each compartment; means for giving the box one full revolution about said pivotal axis for each revolution of the wheel; a main valve having stationary and rotating elements; a main vacuum pipe connected with said stationary element; means for connecting the vacuum chambers of said box with the rotary element of the main valve comprising a header intermediate said box and the main valve and a plurality of looped flexible hoses leading from said header to the several vacuum chambers of said box; a vacuum valve to control the flow of fluids between the header and the rotating element of the main valve; and means operated by the movement of the wheel for opening and closing said vacuum valve comprising a cam carried by the valve and movably supported abutments for engaging predetermined portions of said cam.

9. In a starch cake forming machine, the combination of: a wheel having a hollow hub providing a starch chamber and revoluble in a vertical plane; a stationary starch supply pipe extending to said chamber; a plurality of cake forming boxes pivotally suspended on said wheel to assume upright filling positions; pipe connections having a fixed relation on the wheel and leading from said starch chamber to each of the boxes and provided with valves; a stationary means for opening and closing said valves; a starch supply pipe arranged above the wheel and provided with a valve; and means on the wheel for opening and closing said last-named valve.

10. In a starch cake forming machine, the combination of: a wheel revoluble in a vertical plane; a plurality of cake forming boxes pivotally suspended on the wheel from horizontal axes; means for giving each box one full revolution about its pivotal axis for each revolution of the wheel comprising: pinions on said boxes and a stationary rack for engaging the pinions at a predetermined location, whereby the boxes are inverted and then brought back to an upright position by a single continuous movement; and conduit means attached to the boxes comprising flexible looped hoses which permit the reversing movements of the boxes.

11. In a starch cake forming machine, the combination of: a wheel; a plurality of cake forming boxes pivotally suspended on the wheel each having a plurality of compartments and formed with water pervious bottoms and vacuum chambers under said bottoms; pinions on said boxes and a stationary rack for inverting the boxes; a hollow hub on the wheel providing a starch feed chamber; a stationary starch pipe extending into said hub; starch headers, one for each box, provided with discharge pipes leading to the compartments of the box, respectively; pipes connecting said feed chamber with said starch headers, respectively, provided with valves; stationary means for opening and closing said valves; a starch supply pipe arranged above the wheel and provided with discharge nozzles, one for each compartment of the boxes; a valve in said starch pipe; means on the wheel for opening and closing said valve; a main valve having stationary and rotating elements; vacuum and compressed air pipes connected with said stationary element; air headers, one for each box, flexible hoses connecting each air header with the vacuum chambers, respectively, of each box; and pipes connecting the air headers with the rotating element of the main valve.

12. In a starch cake forming machine, the combination of: a wheel; a plurality of cake forming boxes pivotally suspended on the wheel each having a plurality of compartments and formed with water pervious bottoms and vacuum chambers under said bottoms; pinions on said boxes and a stationary rack for inverting the boxes; a hollow hub on the wheel providing a starch feed chamber; a stationary starch pipe extending into said hub; starch headers, one for each box, provided with discharge pipes leading to the compartments of the box, respectively; pipes connecting said feed chamber with said starch headers, respectively, provided with valves; stationary means for opening and closing said valves; a starch supply pipe arranged above the wheel and provided with discharge nozzles, one for each compartment of the boxes; a valve in said starch pipe; means on the wheel for opening and closing said valve; a main valve having stationary and rotating elements; vacuum and compressed air pipes connected with said stationary element; air headers, one for each box, flexible hoses connecting each air header with the vacuum chambers, respectively, of each box; pipes connecting the air headers with the rotating element of the main valve; valves in said pipes; and a two-position device, adapted to be set in one position to open said last-named valves, and in the other position to close the same.

13. In a starch cake forming machine, the combination of a movable supporting structure; a cake forming box pivotally suspended from a horizontal axis carried by said supporting structure and having a water pervious bottom; means for filling the box with a starch-water mixture; means for creating a vacuum which withdraws water through the bottom of the box; and means for rotating the box for a full revolution about said pivotal axis, whereby the box is inverted to discharge the formed starch cake and thereafter brought into upright position by one continuous movement.

CARL HAGEN.